(12) United States Patent
Wolff

(10) Patent No.: US 12,329,185 B2
(45) Date of Patent: Jun. 17, 2025

(54) SYSTEM AND METHOD FOR CREATING CAVITATION AND/OR FLASH

(71) Applicant: James B. Wolff, Portland, OR (US)

(72) Inventor: James B. Wolff, Portland, OR (US)

(73) Assignees: Formtec, LLC., Sheboygan, WI (US); Spherical IP, LLC., Damascus, OR (US)

( * ) Notice: Subject to any disclaimer, the term of this patent is extended or adjusted under 35 U.S.C. 154(b) by 0 days.

(21) Appl. No.: 14/121,843

(22) Filed: Oct. 23, 2014

(65) Prior Publication Data

US 2016/0113310 A1 Apr. 28, 2016

(51) Int. Cl.
*A23L 13/60* (2016.01)
*A23L 5/30* (2016.01)

(52) U.S. Cl.
CPC .............. *A23L 13/60* (2016.08); *A23L 5/30* (2016.08)

(58) Field of Classification Search
CPC ........... A23L 5/30; A23L 13/60; A23P 30/10; B65G 2812/1633; F01N 2470/30; B01F 5/043
USPC ...................................................... 366/163.2
See application file for complete search history.

(56) References Cited

U.S. PATENT DOCUMENTS

| | | | | |
|---|---|---|---|---|
| 2,980,537 A * | 4/1961 | Hagen | ........................ | A23L 5/32 99/DIG. 12 |
| 3,793,466 A * | 2/1974 | Kawkins et al. | ........ | A22C 7/00 426/274 |
| 3,937,445 A * | 2/1976 | Agosta | ..................... | B01F 23/41 366/341 |
| 4,205,415 A * | 6/1980 | Orchard | .................... | A22C 7/00 425/298 |
| 4,259,361 A * | 3/1981 | Procter | ................... | A23L 13/10 426/453 |
| 4,516,291 A * | 5/1985 | Goldberger | .............. | A22C 7/00 426/513 |
| 4,541,143 A * | 9/1985 | Holly | ................... | A22C 7/0084 426/513 |
| 4,690,245 A * | 9/1987 | Gregorich | ............... | F01N 1/003 138/40 |
| 4,842,777 A * | 6/1989 | Lamort | ................. | B01F 5/0415 209/170 |
| 4,845,952 A * | 7/1989 | Beebe | .................... | B01F 5/0415 60/737 |
| 4,865,820 A * | 9/1989 | Dunster | .................. | C01B 3/386 422/220 |
| 5,033,545 A * | 7/1991 | Sudol | .................. | E21B 41/0078 134/167 C |
| 5,302,660 A * | 4/1994 | Klinksiek | ............. | B01F 5/0415 422/131 |
| 5,748,694 A * | 5/1998 | King | .................... | G21C 3/3206 376/313 |

(Continued)

OTHER PUBLICATIONS

Phillip Eisenberg; "Cavitation"; Jan. 26, 2009; http://web.mit.edu/hml/ncfmf/16CAV.pdf; pp. 121-122.*

(Continued)

*Primary Examiner* — Emmanuel S Luk
(74) *Attorney, Agent, or Firm* — Philip M. Weiss; WEISS & WEISS

(57) ABSTRACT

An apparatus and method for creating a cavitation effect and/or flash effect. The apparatus and method can be used in a food product molding machine.

3 Claims, 3 Drawing Sheets

(56) References Cited

U.S. PATENT DOCUMENTS

| | | | | |
|---|---|---|---|---|
| 5,795,610 | A * | 8/1998 | London | A21C 11/00 |
| | | | | 425/405.1 |
| 5,918,637 | A * | 7/1999 | Fleischman | B01D 3/008 |
| | | | | 138/40 |
| 5,957,665 | A * | 9/1999 | Kanzler | F04F 5/464 |
| | | | | 417/55 |
| 7,507,014 | B1 * | 3/2009 | League | B01F 27/2722 |
| | | | | 366/349 |
| 7,784,999 | B1 * | 8/2010 | Lott | B01F 5/0413 |
| | | | | 366/163.2 |
| 8,646,486 | B2 * | 2/2014 | Schommer | E03C 1/08 |
| | | | | 138/40 |
| 9,200,650 | B2 * | 12/2015 | Van Buskirk | F15D 1/025 |
| 2003/0170359 | A1 * | 9/2003 | Garwood | A23B 4/16 |
| | | | | 426/392 |
| 2012/0324789 | A1 * | 12/2012 | Pease | A01G 31/00 |
| | | | | 47/62 N |
| 2013/0064917 | A1 * | 3/2013 | Wolff | A22C 7/0084 |
| | | | | 425/198 |
| 2013/0164425 | A1 * | 6/2013 | Wolff | B02C 18/365 |
| | | | | 426/513 |
| 2013/0216689 | A1 * | 8/2013 | Schlebusch | A23L 13/52 |
| | | | | 426/643 |
| 2014/0255571 | A1 * | 9/2014 | Goranson | A23L 11/32 |
| | | | | 426/399 |
| 2015/0024102 | A1 * | 1/2015 | Emanuel | A23G 9/46 |
| | | | | 426/474 |
| 2015/0321161 | A1 * | 11/2015 | Oklejas, Jr. | C02F 1/34 |
| | | | | 366/163.2 |
| 2017/0028364 | A1 * | 2/2017 | Matsunaga | B01F 5/04 |
| 2017/0225176 | A1 * | 8/2017 | Menne | B03D 1/242 |

OTHER PUBLICATIONS

Paul Jesse Milly; Apr. 29, 2007; "Utilizing Hydrodynamic Cavitation and Ultraviolet Irradiation To Improve The Safety Of Minimally Processed Fluid Food"; https://getd.libs.uga.edu/pdfs/milly_paul_j_200705_phd.pdf;Entire pages within citation.*

Cullen et al.; "Novel Thermal and Non-Thermal Technologies for Fluid Foods"; Jul. 21, 2011; Academic Press; First Edition, p. 137.*

Parag R. Gogate; "Application of Hydrodynamic Cavitation for Food and Bioprocessing"; Oct. 29, 2010; https://link.springer.com/chapter/10.1007%2F978-1-4419-7472-3_6; Entire pages within citation.*

Zhang, J. X., "Analysis on the effect of venturi tube structural parameters on fluid flow", Jun. 28, 2017, AIP Advances, vol. 7. No. 6, https://aip.scitation.org/doi/full/10.10631/1.4991441 (Year: 2017).*

* cited by examiner

SYSTEM AND METHOD FOR CREATING CAVITATION AND/OR FLASH

FIELD OF THE INVENTION

The present invention relates to an apparatus and method for creating cavitation and/or flash effect.

BACKGROUND OF THE INVENTION

Cavitation is defined as the process of formation of the vapor phase of a liquid when it is subjected to reduced pressures at constant ambient temperature. A liquid is said to cavitate when vapor bubbles form and grow as a consequence of vapor production. When the phase transition results from hydrodynamic pressure changes, a two-phase flow composed of a liquid and its vapor is called a cavitating flow. Cavitating flow may be seen and heard as water flows through a glass venturi tube. Another example of cavitation occurs in the low pressure regions on marine propellers at high rotation rates.

SUMMARY OF THE INVENTION

The present invention relates to an apparatus and method for creating cavitation and/or flash. It is an object of the present invention for the apparatus and method to be used with a food product molding machine. It is an object of the present invention for the apparatus and method to be used on a breather plate of a food product molding machine.

It is an object of the present invention to create cavitation by using a sphere which is connected to a cylinder. It is an object of the present invention for there to be a ratio between the sphere and cylinder which creates the cavitation. It is an object of the present invention to have cavitation with flash. It is an object of the present invention to have cavitation without flash.

It is an object of the present invention for the cavitation to be used with a food product such as meat such that the cavitation breaks up the particle size of sinew of the meat and moves the meat along. It is an object of the present invention for the cavitation to cause the meat to become fluffy.

It is an object of the present invention for any product that goes from the sphere to the cylinder to have an acceleration and a pressure drop. A change in temperature correlates to a change in pressure. The different factors which contribute to the cavitation are pressure difference, diameter difference, length difference, acceleration and a difference of the media.

It is an object of the present invention that when a user wants to create flash that a shorter cylinder length combined with a diameter ratio differences between sphere and cylinder is used.

It is an object of the present invention that any appliance that uses fuel, liquid or gas can use the sphere-cylinder device to create a cavitation. It is an object of the present invention to create cavitation within a dryer or hot water heater with or without flash.

It is an object of the present invention to use the cavitation with a breather plate in a food processing machine or with a gradiating device.

It is an object of the present invention for a hole or orifice to change size from a larger to a smaller diameter with vertical or concave sides. The principle has design similarities to a venturi. By changing the diameters of a sphere and/or cylinder, a venturi design creates cavitation. The restriction to the flow of product results in product acceleration with a corresponding pressure drop through the orifice.

By reducing the cross-sectional area of a tube through which a substance passes, the velocity is increased. This is the principle of Conservation of Mass. When the velocity increases the pressure of the material is reduced. This is the principle of the Conservation of Energy.

For every liquid, there is a ratio between the cross-sectional area (C) and the cross-sectional area (c) through which velocity can only be increased by reducing temperature or increasing pressure. Although ground meat is not a homogeneous liquid, the same concepts still apply.

As a result, using the geometric properties of a sphere or similar shape allows the ability to obtain cavitation properties using standard production practices.

All points on a sphere are the same distance from a fixed point. Contours and plane sections of spheres are circles. Spheres have the same width and girth. Spheres have maximum volume with minimum surface area. All of the above properties allow meat to flow with minimum interruptions. There are no static or dead zones. No matter what angle the cylinder intersects the sphere, the cross section is always a perfect circle.

It is an object of the present invention to have spherical geometry or a similar shape in breather plate to create cavitation effects.

The present invention relates to a food molding machine having a breather plate. A breather plate normally has a thickness less than 3/16" in the area of the breather holes. A breather plate is positioned adjacent to the mold plate and opposite the fill slot plate. The breather plate is designed to evacuate air from the patty cavities and collect and route excess food matter back to a food supply source. The breather plate contains various ports which allow evacuation of air and accumulation of excess food matter from the filled patty cavities. The ports feed into a channel of openings which is cut into the back side of the breather plate.

A stationary or movable breather plate sits adjacent to the mold plate on the opposite side of the fill slot, and slideably engages the mold plate. The breather plate includes at least one air pressure release passage, wherein a plurality of small breather holes enable the cavities of the mold plate to fluidly communicate with the passage. The air passage enables air in the cavities to escape as the machine pumps the cavities full of meat. The mold cover plate is adjacent the breather plate and its associated passage.

In the current breather plate designs there is a resistance to forming the patties wherein evacuate out of the holes in the breather plate. In the case of prior art breather plates, the orifices are cylindrical and vary in number of orifices and diameters.

This air flow can be accelerated by using a system which will reduce the cylinder size. Using the equation from Bernoulli's law of $A_1V_1=A_2V_2$, the velocity is increased by reducing the cross sectional area.

The typical way of accomplishing this is the use of a venturi nozzle. However, a venturi requires a gradual area reduction and a finite length throat. Given the restrictions of the plate thickness in the breathing area, it is not feasible to put current venturi designs in a breather plate.

However, utilizing the properties of a sphere, the air can achieve acceleration by intersecting a cylinder with a sphere of a larger diameter.

In a sphere pressure is equal in all directions. Therefore, when the sphere is intersected by a cylinder, the air will move in a direction coaxial with the cylinder at a high velocity. The impact on the meat particles in the breather system is greater because air moving at a higher velocity will generate more momentum.

It is an object of the present invention to provide a cavitation effect in the orifice by creating a sphere to cylinder orifice having specific diameter and/or cross sectional areas between the sphere and cylinder. This creates a cavitation effect. This causes the product to change its material state. It is an object of the invention for this to create a self-cleaning breather plate. The spherical cut creates equal pressure in all directions. It is an object of the present invention to have a spherical structure which has a diameter which is no greater than the choke flow for the liquid gas or solid used and is no less than the diameter of the connected cylindrical portion.

The present invention relates to a food molding machine having a mold plate and at least one mold cavity therein. A mold plate drive is connected to the mold plate for driving the mold plate along a given path, and a repetitive cycle, between a fill position and a discharge position. A food pump is provided for pumping a moldable food product through a fill passage connecting the food pump to the mold cavity when the mold plate is in the fill position. A fill plate, interposed in the fill passage adjacent to the mold plate has a fill slot, fill horn, or multiplicity of fill orifices distributed in a predetermined pattern throughout an area aligned with the mold cavity when the mold plate is in fill position. It is an object of the present invention for the paths to comprise spherical structures. It is an object of the present invention to have a spherical structure which has a diameter which is no greater than the choke flow for the liquid gas or solid used and is no less than the diameter of the connected cylindrical portion. It is an object of the present invention for the side of the fill plate which is in contact with the stripper plate to comprise a spherical structure. By changes in the ratio of the diameter and/or cross sectional area of the sphere to the cylinder, a "cavitation" condition is created. By using a spherical structure intersected with a cylinder, it creates transitions which can be manufactured whose geometry creates a cavitation.

It is an object of the present invention for the stripper plate to be interposed in the fill passage immediately adjacent to the fill plate. It is an object of the present invention for the stripper plate to be movable between the fill and covered and/or partially covered discharge locations. It is an object of the present invention for the stripper plate to have a multiplicity of fill openings aligned one-for-one with the fill orifices in the fill plate when the stripper plate is in fill position. It is an object of the present invention for the stripper plate drive to be synchronized with the mold plate drive, such that the movement of the stripper plate facilitates the cutting of the meat product, which was pushed through the fill plate by the food pump. It is an object of the present invention for the stripper plate drive to move the stripper plate to its discharge position, in each mold cycle, before the mold plate moves appreciably toward the discharge location. It is an object of the present invention for the stripper plate drive to maintain the stripper plate in the discharge position until the mold plate cavity is displaced beyond the fill orifices.

It is an object of the present invention to have a spherical structure which has a diameter which is no greater than the choke flow for the liquid gas or solid used and is no less than the diameter of the connected cylindrical portion to create conditions to meat flow which maintain improved cell structure.

It is an object of the present invention to provide a cavitation effect in the orifice by creating a sphere to cylinder hole with a ratio between the diameters or the cross sectional areas. This creates a cavitation effect. It is an object of the present invention for this to be used in a fill plate.

It is an object of the present invention to provide a cavitation effect in the orifice by creating a sphere to cylinder hole with a ratio between the diameters or the cross sectional areas. This creates a cavitation effect. It is an object of the present invention for this to be used in a stripper plate.

It is an object of the present invention to provide a cavitation effect in the orifice by creating a sphere to cylinder hole with a ratio between the diameters or the cross sectional areas. This creates a cavitation effect. It is an object of the present invention for this to be used in a breather plate.

DETAILED DESCRIPTION

Figure 1:
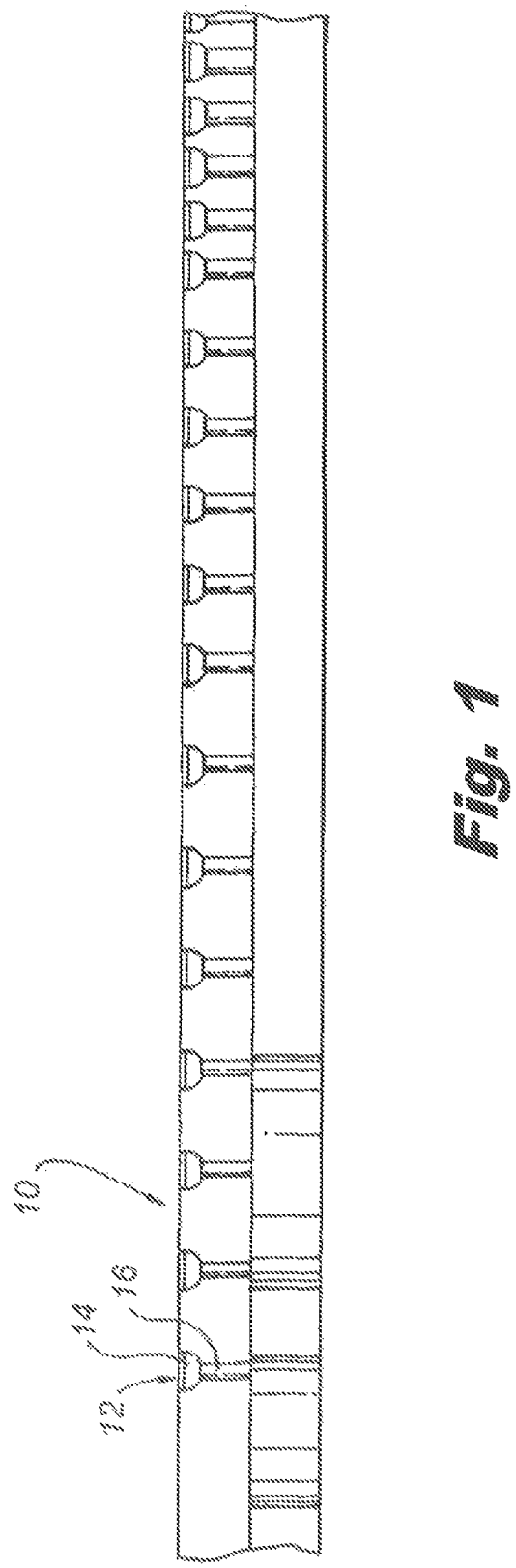
FIG. 1 is a cross-sectional view of the device of the present invention.

FIG. 1 shows a cross-sectional view of a breather plate 10 having an orifice 12 that is comprised of a spherical section 14 and a cylindrical section 16. Based on the diameter and cross-sectional area of the spherical section 14, and the cylindrical section 16, a cavitation is created.

Figure 2:
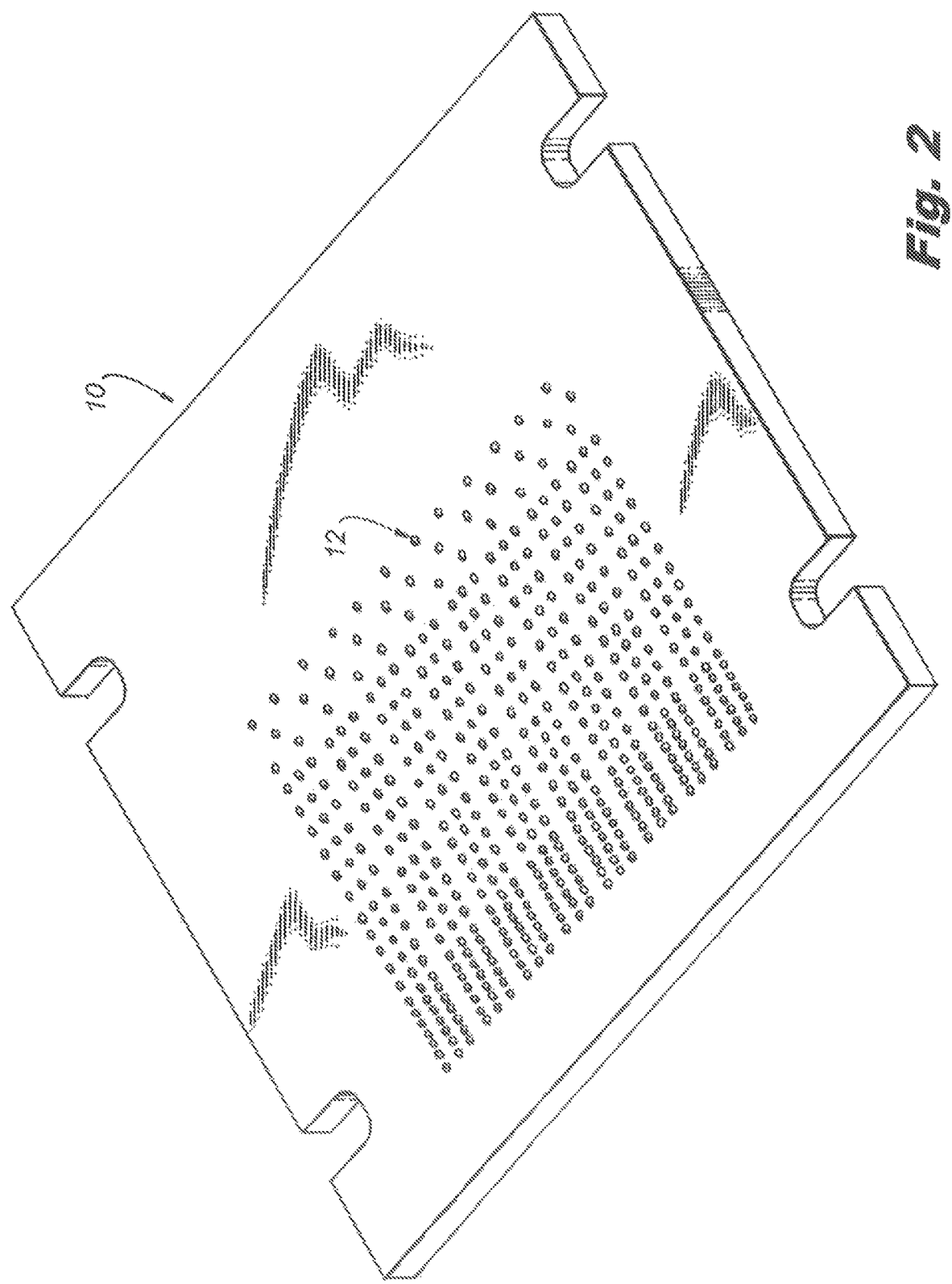
FIG. 2 is a top view of the device of the present invention.

FIG. 2 shows a top view of the breather plate 10 having orifices 12 which is comprised of a spherical section 14 and a cylindrical section 16.

Figure 3:
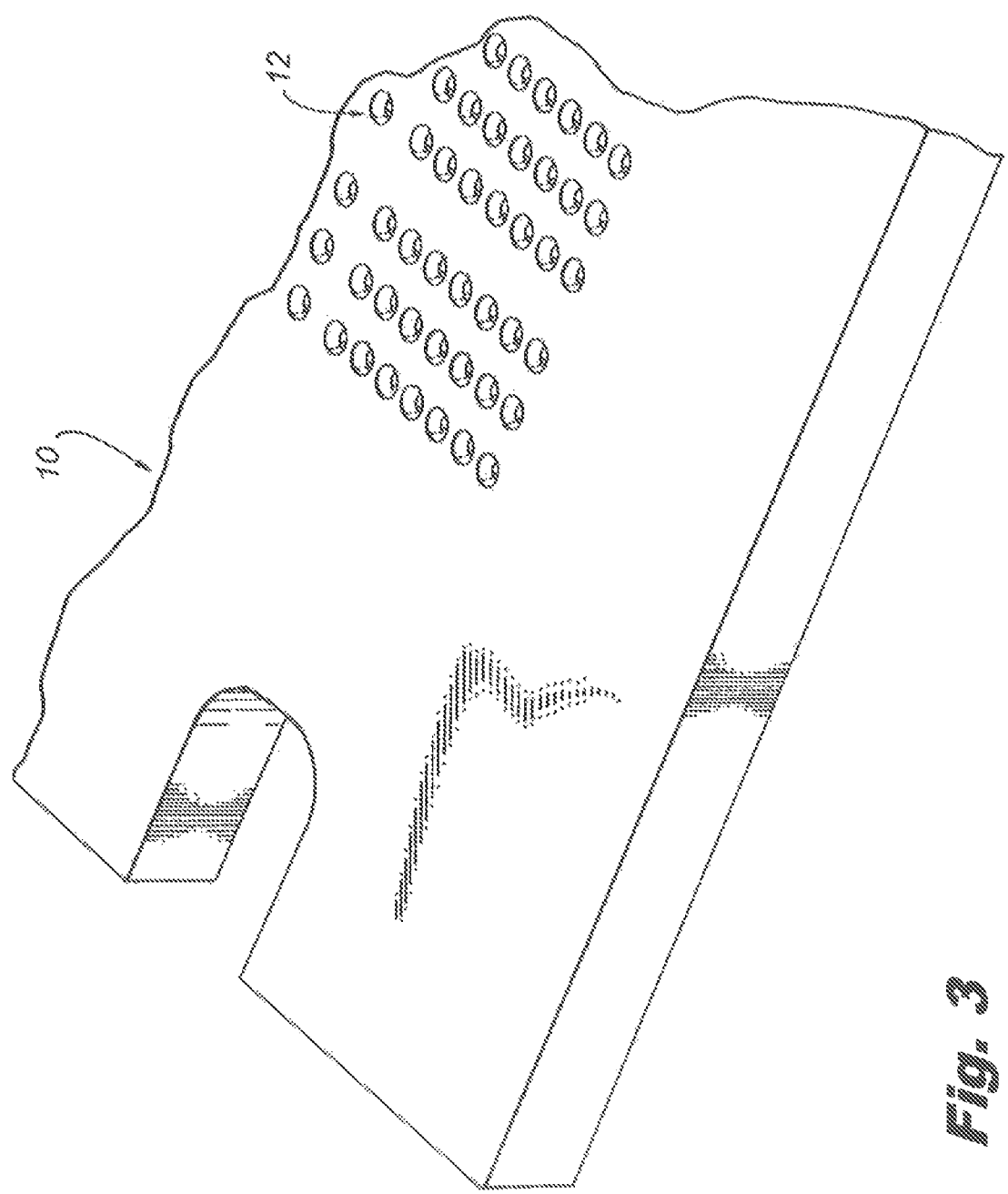
FIG. 3 is a top view of the device of the present invention.

FIG. 3 shows a top view of a breather plate 10 having orifices 12 which are comprised of a spherical section 14 and a cylindrical section 16.

Below is a table showing different sizes for the cylinder diameter, cylinder cross-section, spherical diameter, spherical cross-sectional area, all of which create a sphere to cylinder diameter ratio and a sphere to cylinder cross-sectional ratio.

| SPHERICAL DIAMETER | SPHERICAL CROSS-SECTIONAL AREA | CYLINDER DIAMETER | CYLINDER CROSS-SECTIONAL AREA | DIAMETER RATIO | CROSS-SECTIONAL AREA RATIO |
|---|---|---|---|---|---|
| .110 | .0095 | .040 | .0012 | 2.75 | 7.92 |
| .110 | .0095 | .045 | .00159 | 2.44 | 5.97 |
| .110 | .0095 | .050 | .00196 | 2.20 | 4.84 |
| .110 | .0095 | .055 | .00237 | 2.00 | 4.00 |
| .110 | .0095 | .060 | .0028 | 1.83 | 3.39 |
| .110 | .0095 | .064 | .0032 | 1.719 | 2.96 |

-continued

| SPHERICAL DIAMETER | SPHERICAL CROSS-SECTIONAL AREA | CYLINDER DIAMETER | CYLINDER CROSS-SECTIONAL AREA | DIAMETER RATIO | CROSS-SECTIONAL AREA RATIO |
|---|---|---|---|---|---|
| BREATHER PLATE DIAMETERS AND CROSS SECTIONAL AREAS FOR .125 SPHERE | | | | | |
| 0.125 | 0.012271836 | 0.0400 | 0.00126 | 3.125 | 9.766 |
| 0.125 | 0.012271836 | 0.0450 | 0.00159 | 2.778 | 7.716 |
| 0.125 | 0.012271836 | 0.0500 | 0.00196 | 2.500 | 6.250 |
| 0.125 | 0.012271836 | 0.0550 | 0.00238 | 2.273 | 5.165 |
| 0.125 | 0.012271836 | 0.0600 | 0.00283 | 2.083 | 4.340 |
| 0.125 | 0.012271836 | 0.0640 | 0.00322 | 1.953 | 3.815 |

A food molding machine has a mold plate and at least one mold cavity therein. A mold plate drive is connected to the mold plate for driving the mold plate along a given path, and a repetitive cycle, between a fill position and a discharge position. A food pump pumps a moldable food product through a fill passage connecting the food pump to the mold cavity when the mold plate is in the fill position. A fill plate, interposed in the fill passage immediately adjacent to the mold plate has a fill slot, fill horn, or multiplicity of fill orifices distributed in a predetermined pattern throughout an area aligned with the mold cavity when the mold plate is in fill position. In an embodiment, the side of the fill plate which is in contact with the stripper plate consists of a spherical structure that has a diameter which is no greater than the choke flow for the liquid gas or solid used and is no less than the diameter of the connected cylindrical portion. By using a spherical structure intersected by a cylinder it creates transitions which can be manufactured whose geometry provides a cavitation effect.

A stripper plate is interposed in the fill passage immediately adjacent to the fill plate. The stripper plate is movable between the fill and discharge locations. The stripper plate has a multiplicity of fill openings aligned one-for-one with the fill orifices in the fill plate when the stripper plate is in fill position. A stripper plate drive is synchronized with the mold plate drive, such that the movement of the stripper plate facilitates the cutting of the meat product, which was pushed through the fill plate by the food pump. The stripper plate drive moves the stripper plate to its discharge position, in each mold cycle, before the mold plate moves appreciably toward the discharge location. The stripper plate drive maintains the stripper plate in the discharge position until the mold plate cavity is displaced beyond the fill orifices.

A spherical geometry feeding into a circular cross section creates a product velocity increase while maintaining more consistent pressure on the food product. A sphere has the following properties:

All points on a sphere are the same distance from a fixed point.
Contours and plane sections of spheres are circles.
Spheres have the same width and girth.
Spheres have maximum volume with minimum surface area.
These properties allow food products to flow with minimum interruptions. There are no static or dead zones.
No matter what angle the cylinder intersects the sphere; the cross section is always a perfect circle.
Pressure inside of a sphere is uniform in all directions.

When food product is passed through a circular cross section of a sphere, the fact that pressure is uniform in a sphere creates forces which will be coaxial with the sphere. The reduction in area accelerates the food product through the cylindrical section of the fill plate.

The invention claimed is:

1. A method for creating cavitation comprising:
   placing a moldable product through a sphere connected to a cylinder wherein when said moldable product goes from said sphere to said cylinder there is an acceleration and a pressure drop of said moldable product;
   creating a cavitation effect to said moldable product by using said sphere connected to said cylinder;
   said cavitation defined as a process of formation of a vapor phase of said moldable product when it is subjected to reduced pressure at constant ambient temperature;
   wherein said moldable product is meat and where said cavitation breaks up sinews of said meat.

2. The method of claim 1 wherein said sphere connected to said cylinder is found in a breather plate having a thickness of 3/16" or less.

3. The method of claim 1 wherein factors that contribute to said cavitation consist of pressure difference between said sphere and said cylinder, diameter difference between said sphere and said cylinder, length difference between said sphere and said cylinder.

* * * * *